March 25, 1924.

C. C. LOMBARDO ET AL 1,487,788

CANDY MAKING MACHINE

Filed March 16, 1923  3 Sheets-Sheet 1

INVENTORS
Carmelo C. Lombardo
Joseph Mendola
BY
ATTORNEY

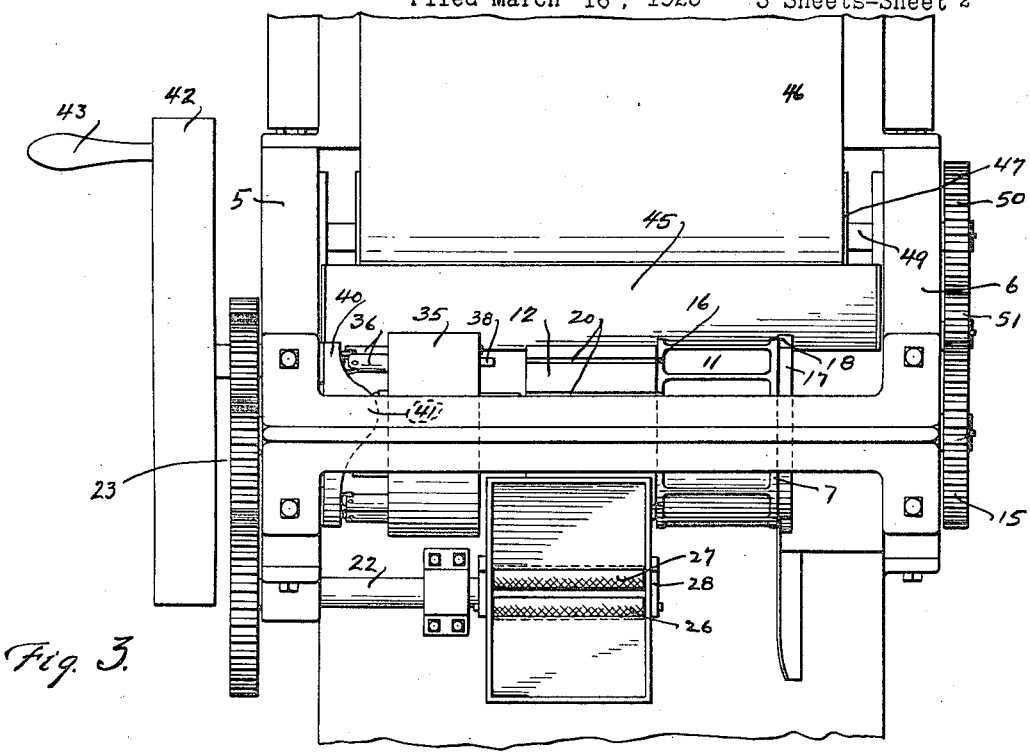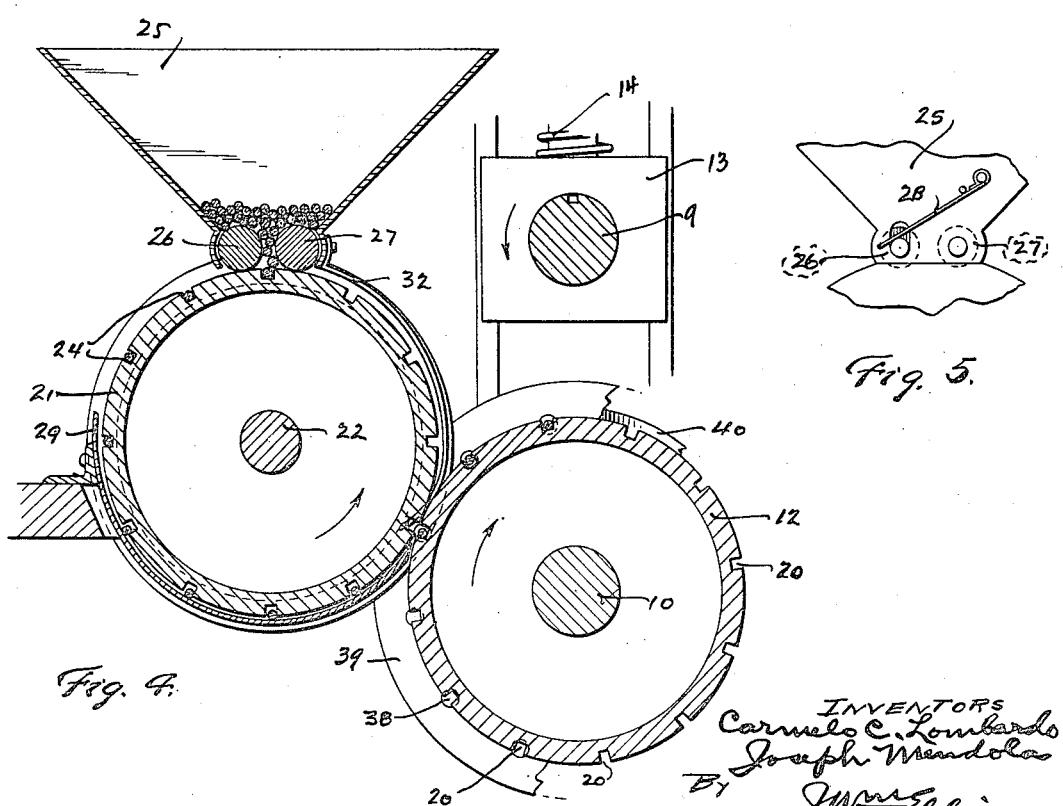

Patented Mar. 25, 1924.

1,487,788

UNITED STATES PATENT OFFICE.

CARMELO C. LOMBARDO AND JOSEPH MENDOLA, OF BUFFALO, NEW YORK.

CANDY-MAKING MACHINE.

Application filed March 16, 1923. Serial No. 625,651.

*To all whom it may concern:*

Be it known that we, CARMELO C. LOMBARDO and JOSEPH MENDOLA, citizens of the United States of America, and residents of the city of Buffalo, county of Erie, and State of New York, have invented a certain new and useful Candy-Making Machine, of which the following is a full, clear, and exact description.

Our invention relates in general to candy making machines, and more particularly to a machine for making candy suckers, by means of which a small stick is forced into the piece of candy as the same is being molded into the desired shape.

The principal object of our invention has been to provide a machine of this nature, in which the rolls are so constructed that they may be quickly and easily interchanged so as to adapt the machine to the making of candy suckers of various sizes and shapes, as well as other hard candies.

Another object has been to provide a machine having a stick feeding mechanism, which shall insure positive feeding of the sticks, one at a time to the candy molds.

Furthermore, our machine is provided with a stick feeding device, which has a separate plunger for each of the stick seats in one of the candy rolls.

Moreover, our device is one which is simple and certain in its operation, and one of comparatively few parts, and durable in its construction.

The above objects and advantages have been accomplished by the following device shown in the accompanying drawings, of which:

Fig. 3 is an enlarged, fragmentary, plan view.

Fig. 4 is an enlarged, fragmentary, sectional view, taken through the stick feeding mechanism of our device.

Fig. 5 is a fragmentary view, showing the spring means for the resilient hopper feed roll.

Figure 1:
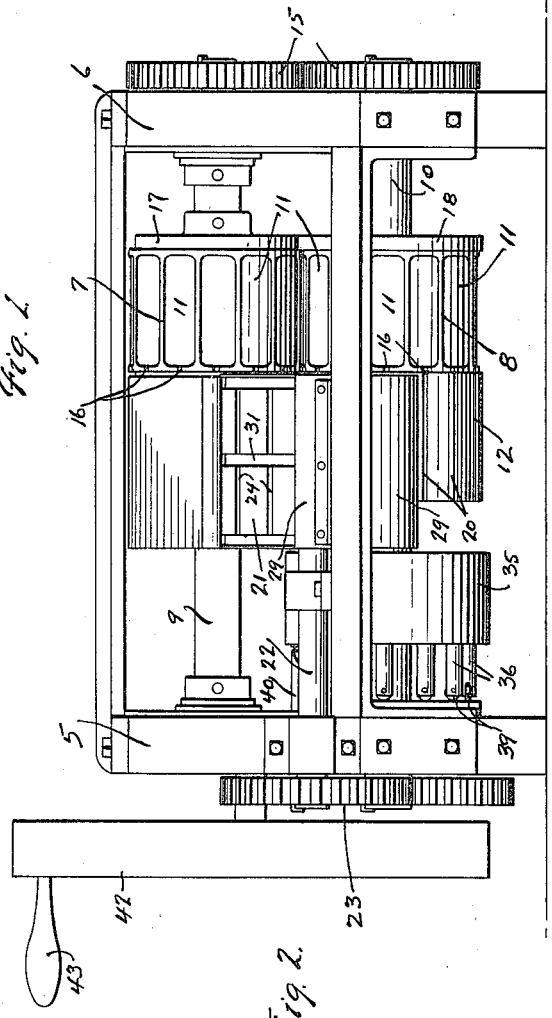
Fig. 1 is a side elevation of our complete machine.
Figure 2:
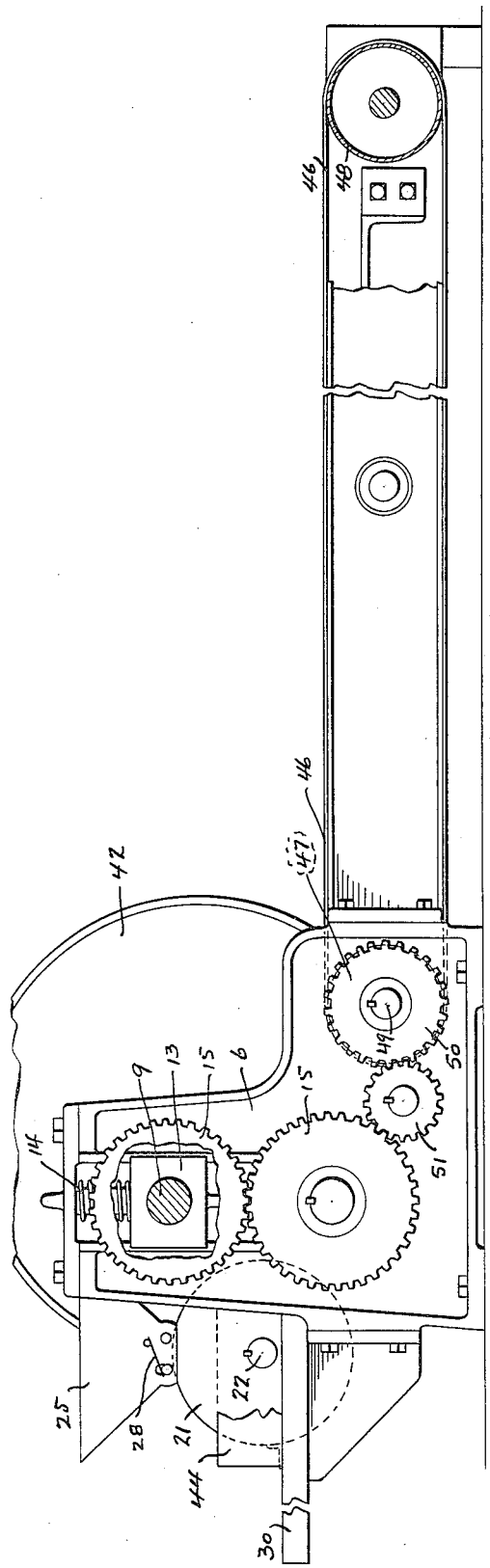
Fig. 2 is a front elevation of the same.
Figure 6:
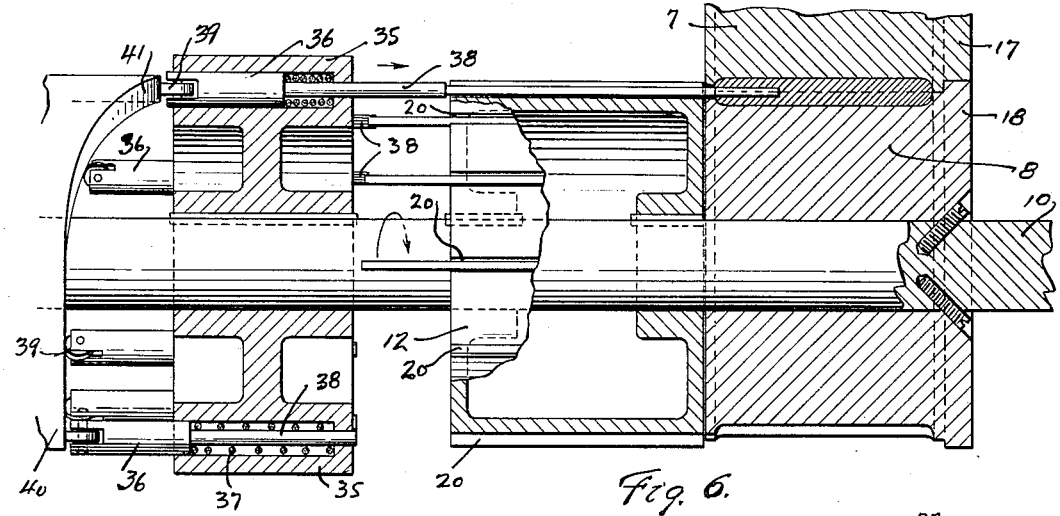
Fig. 6 is a fragmentary, side, sectional view, showing the stick feeding mechanism.
Figures 7, 8:
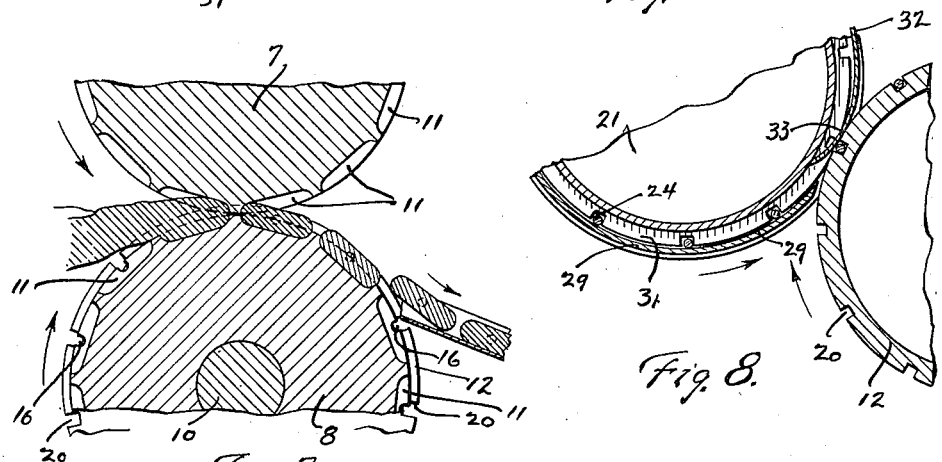
Fig. 7 is a fragmentary, sectional view, taken through the mold rolls.
Fig. 8 is a fragmentary, sectional view of the feed roll and the stick seat roll, showing the stick ejector.
Figure 9:
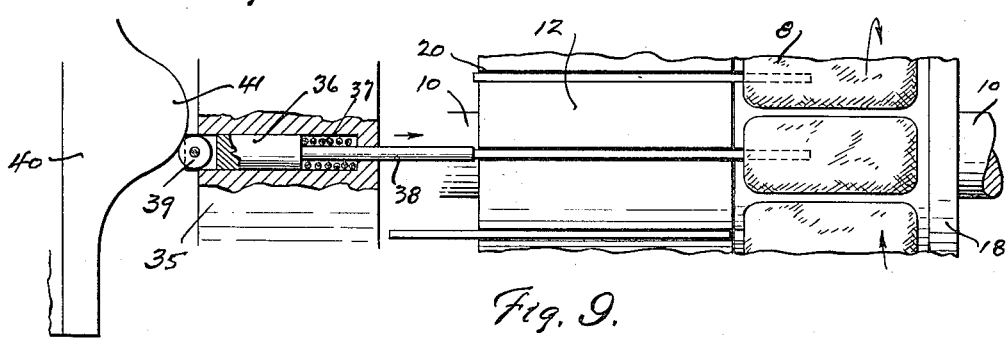
Fig. 9 is a fragmentary, plan view of the stick feeding mechanism.

Our machine comprises standards 5 and 6, arranged one on each side of the machine, whereby bearings are provided for the several rolls and shafts of my device.

Two coacting mold rolls 7 and 8 are provided in my machine, the former being mounted upon a shaft 9 and the latter upon a shaft 10. Each of these rolls is provided in its periphery with a plurality of registering recesses 11, which are preferably of a shape corresponding to substantially one-half of the desired form of the candy to be molded by them. The roll 7 is provided with an end flange 17, smaller in diameter than the roll, and the roll 8 is also provided with an end flange 18. The flange 18 is larger in diameter than the roll 8, and also larger than the end flange 17, whereby the plane of tangency of the two flanges 17 and 18 is different than the plane of tangency of the rolls 7 and 8, thus effectively closing the joint between the rolls at the ends, and preventing the candy from being forced out from between the rolls, while it is being molded. Arranged adjacent the mold roll 8 is a stick seat roll 12. This roll is carried by the shaft 10, and is so arranged that it is held on to the shaft independently of the roll 8. This construction makes it possible for the owner of the machine to change the mold roll 8, and likewise the mold roll 7 without having to disturb the stick seat roll 12. This also makes a cheaper construction possible, since only one stick seat roll need be furnished for any number of mold rolls.

The shafts 9 and 10 are rotatably mounted in blocks 13, one arranged at each end of each of the shafts, and slidably mounted in suitable guides in the standards 5 and 6, whereby the rolls may be easily and quickly removed from the standards for change or replacement. A spring 14 serves to press the shaft 9 downwardly, thereby holding the roll 7 in bearing contact with the roll 8. The shafts 9 and 10 are preferably connected by means of a pair of gears 15, whereby they are rotated in unison.

The stick seat roll 12 is provided with a plurality of longitudinally arranged stick seats 20, one arranged opposite the center of each of the mold recesses 11 in the mold roll 8. The stick seats 20 are arranged on substantially the center line of the complete candy mold formed by two registering recesses 11 of the rolls 7 and 8. Each of the rolls 7 and 8 is therefore provided with a recess or notch 16. Each of these notches is preferably semicircular so that when two of them are in registering position, they form individual guides for the sticks so as to direct and hold them centrally in the candy.

Associated with the stick roll 12 is a stick feed roll 21, which has its periphery in bearing contact with the periphery of the stick roll 12. This feed roll is mounted upon a shaft 22, which is rotated in suitable bearings, and driven by means of a train of gears 23. The stick feed roll is provided in its periphery with a plurality of longitudinally arranged grooves 24, equal in number to the number of grooves 20 in the stick seat roll 12. The grooves 24 are arranged so that each of them will register with one of the grooves 20 at the point where the peripheries of the rolls contact. Arranged above the stick feed roll 21 is a stick hopper 25 into which the sticks are fed. Two hopper rolls 26 and 27 are arranged in the bottom opening of the hopper 25 with a space between them through which one stick at a time is adapted to pass. These rolls are preferably provided with knurled surfaces. The roll 27 is suitably mounted in stationary bearings, and the roll 26 is rotatably mounted so that it may have a limited vertical movement. A spring 28 is arranged at each end of the roll 26, whereby this roll is yieldably pressed in bearing contact with the periphery of the stick feed roll 21. By this arrangement, if, by chance, two sticks should fall into one of the grooves 24, the hopper roll 26 would be forced upwardly, and allow the two sticks to pass between it and the roll 21, whereupon the outer stick will drop out of the grooves as the feed roll is approaching its horizontal center line. The sticks in the grooves, which are substantially above the center line of the roll, will be maintained within the groove by gravity, and a circular shield 29 is arranged about the lower part of the feed roll 21, which serves to retain the sticks in their respective positions until they have been conducted to a point where the periphery of the stick feed contacts with the periphery of the stick seat roll 12. This shield is preferably secured to a table 30, arranged at the front of the machine. The stick feed roll 21 is provided with an annular groove 31, preferably arranged midway the length of the roll. A resilient ejector 32, having its upper end attached to the bottom of the hopper 25, is disposed within the groove 31, and has an inwardly turned end 33 arranged at the point of tangency of the rolls 21 and 12. The groove 31 is cut to such a depth that it lies below the grooves 24, whereby the end 33 will efficiently eject the sticks from the grooves 24 of the roll 21, and cause them to drop into the registering grooves 20 of the roll 12.

Carried by the shaft 10 of the lower mold roll 8, is a plunger head 35, which carries a series of plungers 36, equal in number to the number of grooves 20 in the stick seat roll. Each of the plungers has a spring 37 arranged about its smaller end 38, whereby it will be maintained in its inoperable position. A roller 39 is carried at the outer end of each of the plungers. Each of the plungers is thus slidably held within the plunger head 35, and is preferably provided with any well known means (not shown) for preventing the same from rotating, and thus maintaining the roller 39 in its correct position. A cam 40 is carried by the standard 5, and arranged opposite the outer ends of the plungers 36. This cam has a substantially annular, flat face except for a point substantially opposite the point of tangency of the rolls 7 and 8 where it is provided with a hump 41. Since this cam is stationarily arranged, it will be seen that the plungers 36, carried by the plunger head 35, will each be gradually moved endwise as it approaches the hump 41 of the cam. Since each of these plungers is in registering position with one of the sticks carried by the stick seat roll, it will be clear that the stick will be forced into the candy at the time when it is being molded, and when it is finished by the registering recesses of the molds 7 and 8. When each of the plungers has forced its registering stick into the candy it recedes to its normal position, in which it will remain until it is again brought in contact with the hump 41 of the cam.

A fly wheel 42 is provided for the machine, and it is mounted in suitable bearings, and connected by suitable gearing with the shaft 10. This fly wheel may be belted to any suitable source of power, or it may be rotated by hand by means of the handle 43 provided for this purpose.

The candy, which is to be made into suckers, is placed on the table 30, and moved in between the mold rolls 7 and 8. Suitable guides 44 are carried by the table 30 for directing the candy to the rolls. Arranged back of the rolls is a chute 45 onto which the finished candy suckers drop as they come from the rolls 7 and 8. This chute guides the candy suckers onto a conveyor belt 46, which is suitably mounted on rolls 47 and 48. The shaft 49 of the roll 47 is provided with a gear 50, which is preferably connected with the gear 15 of the roll shaft 10 by means of an idler gear 51. This causes the conveyor belt 46 to travel away from the machine, and the candy is thus allowed to cool and harden before being handled.

From the foregoing description, it will be clear that as the candy is directed in between the guides 44, and fed in between the mold rolls 7 and 8, the same will be molded to the desired shape by the recesses 11 of the mold rolls. As each recess 11 in the mold roll 8 is approaching the registering recess of the mold roll 7, one of the sticks will be gradually pushed along in one of the grooves 20 of the stick seat roll 12, and its end projected into the recess 11. When the mold recess 11 of the roll 8 reaches a point opposite and where it registers with the corresponding half of the mold formed by the recess 11 of the roll 7, it will have been moved substantially its full distance, and the candy, as it is being molded by the two registering halves of the mold, will be forced onto and around the stick thus embedding the stick in the candy. As the mold rolls continue to rotate, the plunger 36 which has actuated the stick just embedded in the candy, is withdrawn and resumes its normal position while the rolls are being rotated. As the two halves of the mold formed by the recess 11 of the rolls 7 and 8 separate, the finished candy sucker is thrown from the recesses, and is conducted to the conveyor belt 46 by means of the chute 45.

Due to the construction of our hopper feed rolls, it will be seen that should any crooked sticks be fed to the stick feed roll, either singly or crowded into a groove bearing another stick, that it will either fall out of the groove as it is approaching the horizontal center of the feed roll or it may be conveniently picked out of the groove by the operator, since all of the sticks pass in front of him before they are delivered to the lower mold roll 8.

Obviously, some other modifications of the details herein shown and described may be made without departing from the spirit of our invention, or the scope of the appended claims; and, we do not, therefore, wish to be limited to the exact embodiment herein shown and described, the form herein described being merely a preferred embodiment thereof.

Having thus described our invention, what we claim is:

1. A candy making machine comprising a pair of coacting mold rolls each provided with mold recesses, a stick seat roll having a plurality of stick seats, a plurality of plungers, corresponding in number with the number of stick seats, arranged adjacent the stick seat roll, and cam means for individually operating the plungers.

2. A candy making machine comprising a pair of coacting mold rolls each provided with mold recesses, a stick seat roll having a plurality of stick seats, a stick feed roll having a plurality of grooves registrable with the grooves of the stick seat roll, a plurality of plungers, corresponding in number with the number of stick seats, and means for individually operating the plunger.

3. A candy making machine comprising a pair of coacting mold rolls each provided with mold recesses, a stick seat roll having a plurality of stick seats, a stick feed roll having a plurality of grooves registrable with the grooves of the stick seat roll, a hopper arranged above the stick feed roll, means for feeding the sticks from the hopper to the feed roll, a plurality of plungers, corresponding in number with the number of stick seats, and means for individually operating the plunger.

4. A candy making machine comprising a pair of coacting mold rolls each provided with mold recesses, a stick seat roll having a plurality of stick seats, a plurality of plungers, corresponding in number with the number of stick seats, arranged adjacent the stick seat roll, each of the plungers being slidably carried by a plunger head and each having a roller at its outer end, and stationarily arranged cam means engageable with the rollers carried by the plunger.

5. A candy making machine comprising a pair of coacting mold rolls each provided with mold recesses, a stick seat roll having a plurality of stick seats, a stick feed roll having a plurality of grooves registrable with the grooves of the stick seat roll, a hopper arranged above the stick feed roll, hopper rollers arranged in the bottom opening of the hopper and engageable with the stick feed roll, a plurality of plungers, corresponding in number with the number of stick seats, and means for individually operating the plungers.

6. A candy making machine comprising a pair of coacting mold rolls each provided with mold recesses, a stick seat roll having a plurality of stick seats, a stick feed roll having a plurality of grooves registrable with the grooves of the stick seat roll, a hopper arranged above the stick feed roll, hopper rollers arranged in the bottom opening of the hopper and engageable with the stick feed roll, one of the hopper rollers being stationary, and the other being movable toward and from the stick feed roll, a plurality of plungers, corresponding in number with the number of stick seats, and means for individually operating the plungers.

7. A candy making machine comprising a pair of coacting mold rolls each provided with mold recesses, a stick seat roll having a plurality of stick seats, a stick feed roll having a plurality of grooves registrable with the grooves of the stick seat roll, the stick feed roll having an annular groove, and an ejector engageable with the grooves and having its end arranged oposite the point of tangency of the stick feed roll and the lower mold roll, whereby the sticks will be ejected from the stick feed roll and transferred to the grooves of the stick seat roll.

8. A candy making machine comprising a pair of coacting mold rolls each provided with mold recesses, a stick seat roll having a plurality of stick seats, a stick feed roll having a plurality of grooves registrable with the grooves of the stick seat roll, a hopper arranged above the stick feed roll, hopper rollers arranged in the bottom opening of the hopper and engageable with the stick feed roll, a circular shield arranged around the bottom portion of the stick feed roll, a plurality of plungers, corresponding in number with the number of stick seats, and means for individually operating the plungers.

In testimony whereof, we have hereunto signed our names.

CARMELO C. LOMBARDO.
JOSEPH MENDOLA.